No. 874,229.
PATENTED DEC. 17, 1907.
J. J. NEF.
CONTROLLING MECHANISM.
APPLICATION FILED SEPT. 15, 1905.
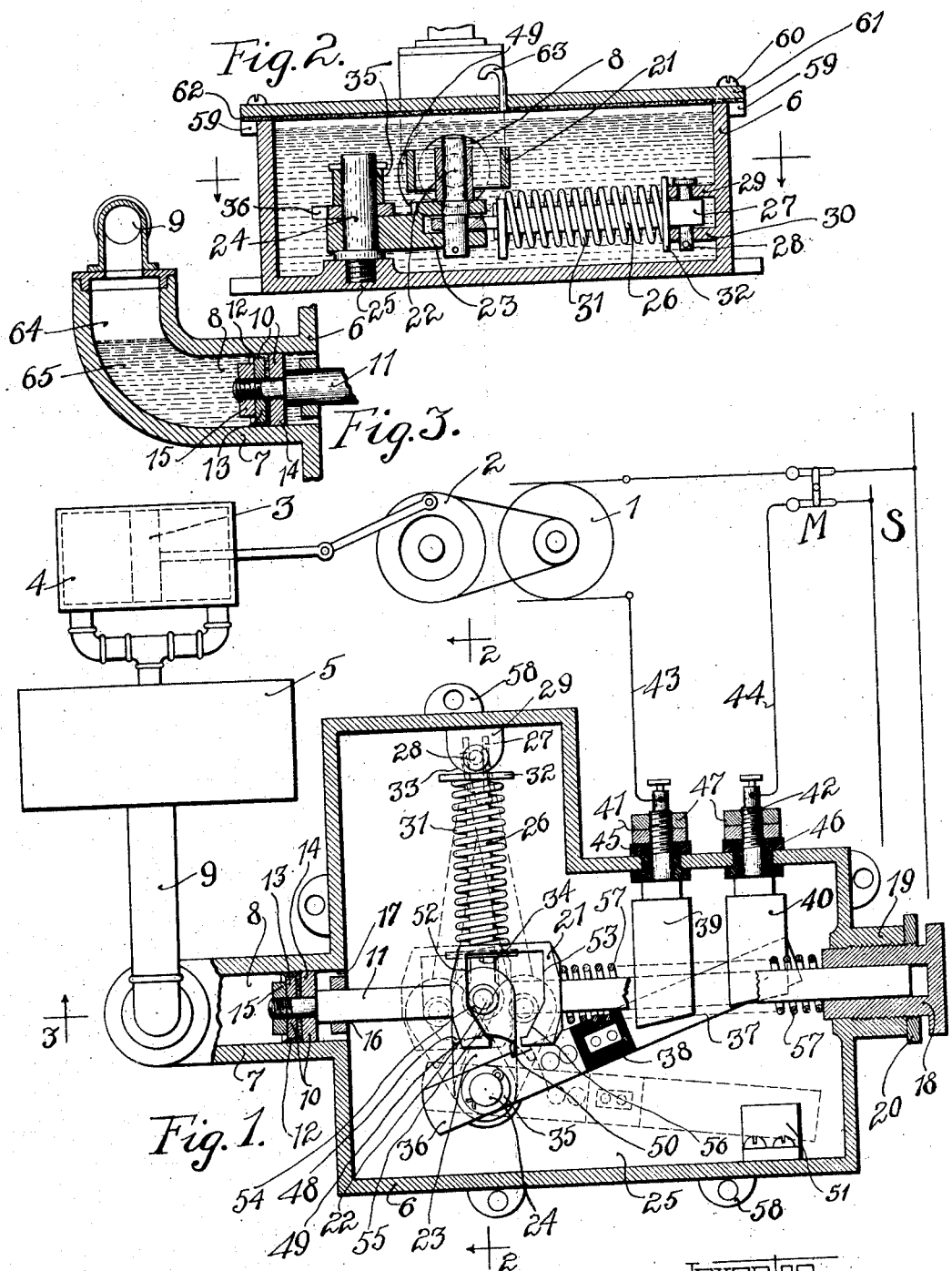
Witnesses:
Arthur H. Boettcher.
Charles J. Schmidt.
Inventor
John J. Nef
By Charles A. Brown
Attorney

UNITED STATES PATENT OFFICE.

JOHN J. NEF, OF CHICAGO, ILLINOIS, ASSIGNOR TO NATIONAL BRAKE AND ELECTRIC COMPANY, OF MILWAUKEE, WISCONSIN, A CORPORATION OF WISCONSIN.

CONTROLLING MECHANISM.

No. 874,229.

Specification of Letters Patent.

Patented Dec. 17, 1907.

Application filed September 15, 1905. Serial No. 278,561.

*To all whom it may concern:*

Be it known that I, JOHN J. NEF, a citizen of the United States, residing at Chicago, in the county of Cook and State of Illinois, have invented a certain new and useful Improvement in Controlling Mechanism, of which the following is a full, clear, concise, and exact description, reference being had to the accompanying drawings, forming a part of this specification.

This invention relates to governors for fluid pressure systems and is applicable particularly to governors for compressed air systems for operating the brakes of railway cars. The object of the invention is to provide a governor for a fluid pressure system which is simple in construction and positive and reliable in operation, which possesses ample strength and which can be manufactured at small cost.

Though my improved governor is susceptible of use in various ways, it is of special utility in air brake systems for railway cars, and I will describe it as used in that way. In such systems, an air compressor is employed driven by an electric motor and supplying compressed air to a storage reservoir from which the air is admitted to the brake cylinders as desired. The governor is controlled by the pressure within the storage reservoir and operates to start or stop the motor driving the compressor. Thus, if an electric motor is employed, the governor closes the circuit thereof when the pressure within the storage reservoir falls below a predetermined minimum and opens it again when the pressure is raised by the compressor to a predetermined maximum.

I have illustrated an embodiment of my invention in the accompanying drawings, in which Figure 1 is a sectional elevation of the governor, showing the parts of the system in which the governor is connected diagrammatically, Fig. 2 is a section of the governor on line 2—2 of Fig. 1, and Fig. 3 is a detail view in section on line 3 of Fig. 1.

The electric motor 1 and the driving mechanism 2 associated therewith serve to cause reciprocation of the piston 3 within the compressor cylinder 4, thereby to force and compress the fluid into the reservoir 5. In systems of this kind it is desirable that the pressure within the reservoir be maintained at a certain maximum value and that upon reduction of such pressure by withdrawal of compressed fluid the motor and compressor be automatically started to restore the pressure to its maximum value. The apparatus for accomplishing this control and regulation is embodied within the casing 6. At one end of this casing is the cylindrical extension 7 forming the piston chamber 8 and connected through the piping 9 with the reservoir 5. A piston head 10 is secured to the end of the piston rod 11 and adapted for reciprocation within the piston chamber 8. This piston head may comprise the cup leather washer 12 secured and clamped between the washers 13 and 14 by means of the nut 15. The valve stem 11 passes through the opening 16 and the piston chamber communicates with the interior of the casing through the opening 17. The other end of the piston rod passes into the hollow plug 18 which is screw threaded into the extension 19 and adapted to be locked in any position by the lock nut 20. At an intermediate point on the piston rod is secured the hollow rectangular cross head 21 surrounding the crank pin 22 extending from the crank arm 23 pivoted to the pin 24 extending from the base 25 of the casing. One end of a link 26 is pivoted to the free end of the crank arm 23. This pivoting may be accomplished by extending the crank pin 22 so that its lower end as shown in Fig. 2 passes through the bifurcated end of the crank arm and through the end of the link 26. The other end 27 of the link 26 is bifurcated and passes about a pivot pin 28 passing through the upper and lower lugs 29 and 30 extending from the casing wall. Surrounding this link 26 is a compression spring 31 abutting against the washer 32 which rests against the curved front edges 33 of the lugs 29 and 30 and against the pin 34 extending through the other end of the link 26. This spring is adjusted to exert a suitable pressure and when the centers of the pivot pins 28, 22 and 24 are in a straight line there will be no turning motion of the crank arm but if the pin 22 be moved a slight distance to either side to carry the pin center outside of the straight line, then the crank arm will be suddenly rotated or thrust by the compressing action of the spring.

Loosely pivoted to the pin 24 above the crank arm 23 as shown in Fig. 2 is the hub 35 carrying the switch blade which may consist of the rear part 36 and the blade part 37 insulated therefrom by insulating strip 38. The blade part 37 is adapted for engagement in the jaws 39 and 40 of the terminals 41, 42, respectively, connected through conductors 43 and 44 with the motor 1 and with the supply circuit S. The terminals 41 and 42 may be passed through the insulating bushings 45 and 46 and clamped in position by clamping nuts 47.

The crank arm 23 is provided with an extension or shoulder 48 to present the points 49 and 50, which points are so positioned with respect to the switch part 36 that when the pin center 22 passes to the left of the dead line or center the point 49 will strike the part 36 at one side of the pivot to throw the blade 37 into the jaws 39, 40 and when the center of the pin 22 moves to the right of the dead line or center the point 50 will strike the part 36 at the other side of the pivot 24 to jerk the blade 37 from the jaws 39 and 40. To prevent rebound of the switch blade a dead jaw 51 may be secured to the casing wall to hold the blade 37. The crank arm is moved to one side or the other of the dead line upon being engaged by either the inner side 52 or the inner side 53 of the cross head 21.

To decrease friction a roller 54 may be mounted on the crank pin 22 between the sides of the cross-head and to afford better guideway and to prevent binding, the ends 55 and 56 of the sides 52 and 53, respectively, near the crank arm pivot are sloped inwardly, as shown.

The fluid under pressure from the reservoir 5 entering the piston chamber 8 tends to move the piston head and rod inwardly but this motion is resisted by the compression spring 57 encircling the piston rod 11 between the cross head and the plug 18. The adjustment of this spring 57 with relation to the piston dimensions is such that the cross head will be moved by the force of the fluid under pressure to carry the crank arm just beyond the dead line when maximum pressure in the reservoir is reached. The force of this spring 57 may be varied by screwing the plug 18 inwardly or outwardly.

The operation of the system is now apparent. If there is no pressure in the system, the crank pin 22 will be at the left of the dead line, having been carried there when the pressure was previously exhausted. The switch blade will therefore have been thrown into the jaws 39 and 40 and upon closure of the main switch M the motor will be immediately started and the compressor fully actuated to drive and to compress fluid into the reservoir 5 and through the piping 9 into the piston chamber 8. The piston head is moved to carry the piston rod 11 toward the right against the compression of the spring 57 and the roller 54 engaging the sides 55 and 52 the crank arm will be also moved toward the right. As before explained the spring 57 is adjusted so that when maximum pressure is reached in the reservoir and in the piston chamber 8 the crank arm will have been carried by the cross head just beyond the dead line and the spring 31 having then become released may exert its compression to suddenly rotate the crank arm to the right whereby the point 50 suddenly strikes the switch blade to jerk the blade from the jaws 39 and 40 to open the motor circuit, the roller 54 then resting against the sloping side 56 of the cross head, the horizontal component of the force of the compression spring 31 being added to the thrust of the piston rod against the spring 57. As the reservoir 5 is drawn upon, however, the pressure is reduced and the force of the spring 57 overpowers the force of the spring 31 and the fluid pressure against the piston 10 as this pressure gradually reduces and when a certain minimum pressure has been reached the crank arm and link 26 will have been returned to the left just beyond the dead line, whereupon the compression spring 31 will suddenly rotate the crank arm to the other end of the stroke to thrust the point 49 against the switch blade, which is suddenly thrown into the jaws 39 and 40 to again close the circuit through the motor and the circuit will remain closed until the compressor has been actuated a sufficient length of time to restore the pressure within the reservoir to its normal value when the crank arm will again be moved beyond a dead center to cause opening of the motor circuit, and so on. This sudden disconnection of the switch blade from the contact jaws of itself tends to eliminate a great deal of sparking but sparking is practically entirely prevented by filling the casing with insulating oil as shown in Fig. 2, which covers the contact points and which also surrounds the springs and other operative parts to preserve them against oxidation and also keeps engaging surfaces well lubricated. The casing 6 is provided with lugs 58 whereby it may be secured to a supporting floor and at its upper edge is provided with threaded lugs 59 for receiving the screws 60 which secure in place the cover 61, the joint between cover and casing being rendered oil tight by means of a gasket 62. This cover may also be provided with the vent 63 through which may escape any gases generated upon breaking of the circuit at the contact points.

The walls within the piston 8 at the inside of the piston head are at all times well lubricated by the oil which has access thereto but as the piston chamber at the other side of the piston head is not in direct communication with the interior of the casing, the lubrication of the walls thereof will depend solely upon the amount of oil which may squeeze by the leather washer 12. The fluid, particularly air, at this side of the piston would be of varying temperature and perhaps very warm and the tendency might be for the leather to harden. I, therefore, extend the piston chamber upwardly a distance, as shown in Fig. 3, to form a chamber 64 which is partly filled with oil and thus the washer will be continually immersed in oil and preserved, the body of oil 65 of course moving with the piston head upon changes in pressure. This piston extension 7 and extension 19 may be cast integral with the casing.

The above described controlling and regulating mechanism is entirely direct and mechanical in its operation, there being no windings present which might be injured or be burned out. The apparatus is very compact and consists of very few and simple parts in which there is practically no deterioration.

As before stated, the principles of this invention need not necessarily be applied to systems in which the motive power is derived from an electric motor as the actuating mechanism may be just as readily utilized for opening or closing controlling valves or circuits for gas, steam or other engines. Modifications in the arrangement and cooperation of the various parts may also be made without departing from the scope or spirit of the invention. I do not, therefore, wish to be limited to the arrangement shown.

I claim as new and desire to secure by Letters Patent:

1. In a fluid pressure governor, the combination of a reciprocating rod, means for moving the same in one direction by fluid pressure, a spring for moving the rod in the opposite direction, toggle-members pivotally connected at one end, a pivotal support for the other end of one of said members, a support for the other end of the other member permitting axial movement of said member as the toggle is buckled, parts on said rod adapted to engage the toggle when the rod is reciprocated and between which the toggle can move free of the rod, a spring acting on the toggle to continue movement thereof started by one of said parts, a movable circuit-controller independently pivoted on said pivotal support for one of the members of the toggle, and a loose connection between said toggle-member and controller whereby the former actuates the latter when operated by the spring acting thereon, substantially as set forth.

2. In a fluid pressure governor, the combination of a casing, a rod mounted to reciprocate therein, a piston on the rod, means within the casing for moving the rod in one direction by fluid pressure on said piston and in the other by a spring, toggle-members within the casing pivotally connected at one end, a pivotal support for the other end of one of said members, a support for the other end of the other member permitting axial movement of said member as the toggle is buckled, parts on said rod adapted to engage the toggle when the rod is reciprocated and between which the toggle can move free of the rod, a spring acting on the toggle to continue movement thereof started by one of said parts, a movable circuit-controller within the casing independently pivoted on said pivotal support for one of the members of the toggle, a loose connection between said toggle-member and controller whereby the former actuates the latter when operated by the spring acting thereon, and oil within the casing submerging said parts, substantially as set forth.

3. In a fluid pressure governor, the combination of a casing having an integral cylindrical extension, a piston reciprocating in said extension, a rod secured to said piston and extending across the casing, a spring for moving said rod in one direction, a toggle mounted within the casing, parts on said rod adapted to engage said toggle and spaced apart to permit movement thereof between them, a spring tending to buckle the toggle, a movable circuit-controller within the casing actuated by said toggle, and oil in said casing submerging the parts therein and in said extension on both sides of the piston therein, substantially as set forth.

4. In a fluid pressure governor, the combination of a reciprocating rod, means for moving said rod in one direction by fluid pressure, a spring for moving the rod in the opposite direction, toggle-members pivotally connected at one end, a pivotal support for the other end of one of said members, a support for the other end of the other member permitting axial movement of said member as the toggle is buckled, parts on said rod adapted to engage the toggle when the rod is reciprocated and between which the toggle can move free of the rod, a spring tending to buckle the toggle, and a movable circuit-controller operated by the toggle, substantially as set forth.

5. In a fluid pressure governor, the combination of a reciprocating rod, means for moving said rod in one direction by fluid pressure, a spring for moving the rod in the opposite direction, toggle-members pivotally connected at one end, a pivotal support for the other end of one of said members, a support for the other end of the other member permitting axial movement of said member as the toggle is buckled, parts on said rod adapted to engage the toggle when the rod is reciprocated and between which the toggle can move free of the rod, a spring tending to buckle the toggle, a movable circuit-controller mounted on said pivotal support independently of the toggle-member thereon, and parts on said controller and toggle-member brought into engagement by buckling the toggle in either direction to actuate said circuit-controller, substantially as set forth.

In witness whereof, I hereunto subscribe my name this 7th day of September A. D., 1905.

JOHN J. NEF.

Witnesses:
CHARLES J. SCHMIDT,
LEONARD W. NOVANDER.